US007834506B2

(12) United States Patent
Hattori

(10) Patent No.: US 7,834,506 B2
(45) Date of Patent: Nov. 16, 2010

(54) WINDING STRUCTURE OF ROTATING ELECTRIC MACHINE

(75) Inventor: Hiroyuki Hattori, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 11/886,177

(22) PCT Filed: Apr. 25, 2006

(86) PCT No.: PCT/JP2006/309141

§ 371 (c)(1),
(2), (4) Date: Sep. 12, 2007

(87) PCT Pub. No.: WO2006/118298

PCT Pub. Date: Nov. 9, 2006

(65) Prior Publication Data

US 2008/0174196 A1     Jul. 24, 2008

(30) Foreign Application Priority Data

Apr. 28, 2005   (JP)   ............................. 2005-132571

(51) Int. Cl.
*H02K 1/00*     (2006.01)
*H02K 3/00*     (2006.01)
*H02K 19/26*    (2006.01)
*H02K 21/00*    (2006.01)
*H02K 23/02*    (2006.01)

(52) U.S. Cl. ........................ 310/180; 310/179; 310/184; 310/198

(58) Field of Classification Search ................. 310/179, 310/180, 184, 198; *H02K 1/00, 3/00, 19/26, H02K 21/00, 23/02*
See application file for complete search history.

(56) References Cited

U.S. PATENT DOCUMENTS 5,654,602 A * 8/1997 Willyoung .................. 310/179

(Continued)

FOREIGN PATENT DOCUMENTS

CN            1444328 A      9/2003

(Continued)

OTHER PUBLICATIONS

Chinese Office Action issued Feb. 5, 2010 for Chinese Application No. 200680014780.9 (with translation).

(Continued)

*Primary Examiner*—Quyen Leung
*Assistant Examiner*—John K Kim
(74) *Attorney, Agent, or Firm*—Oliff & Berridge PLC

(57) ABSTRACT

In a stator winding, series coils are connected in parallel. One series coil includes series-connected U phase coils that are wound oppositely in direction by turns in the order in which the coils are series-connected and that are arranged in the manner that one and the other coil sets of the U phase coils are separated in the circumferential direction of a stator core and are opposite to each other in the radial direction thereof. The other series coil includes series-connected U phase coils that are wound oppositely in direction by turns in the order in which the coils are series-connected and that are arranged in the manner that one and the other coil sets of the U phase coils are separated in the circumferential direction of the stator core and are opposite to each other in the radial direction thereof.

9 Claims, 9 Drawing Sheets

U.S. PATENT DOCUMENTS

| | | |
|---|---|---|
| 5,661,355 A | 8/1997 | Darceot |
| 5,994,812 A * | 11/1999 | Muszynski ............... 310/180 |
| 6,114,790 A * | 9/2000 | Fei ............................ 310/180 |
| 7,408,281 B2 * | 8/2008 | Kinashi ..................... 310/184 |
| 2001/0033116 A1 * | 10/2001 | Rose, Sr. ................... 310/180 |
| 2002/0130578 A1 * | 9/2002 | Anma et al. .............. 310/179 |
| 2003/0168547 A1 | 9/2003 | Komuro et al. |
| 2004/0041489 A1 * | 3/2004 | Horst et al. ............... 310/181 |
| 2004/0183388 A1 * | 9/2004 | Rittmeyer ................. 310/179 |
| 2006/0017347 A1 * | 1/2006 | Rahman .................... 310/208 |
| 2008/0012444 A1 * | 1/2008 | Hattori ..................... 310/198 |
| 2008/0174196 A1 * | 7/2008 | Hattori ..................... 310/180 |

FOREIGN PATENT DOCUMENTS

| | | |
|---|---|---|
| EP | 1 244 195 A1 | 9/2002 |
| JP | A 54-015112 | 2/1979 |
| JP | A 61-196746 | 8/1986 |
| JP | A 62-023339 | 1/1987 |
| JP | U-5-95190 | 12/1993 |
| JP | A 08-308195 | 11/1996 |
| JP | A 10-313557 | 11/1998 |
| JP | A 2000-217290 | 8/2000 |
| JP | A 2003-143822 | 5/2003 |
| JP | A 2003-189565 | 7/2003 |

OTHER PUBLICATIONS

Japanese Office Action dated Jun. 24, 2010 for Japanese Application No. 2005-132571 (with translation).

* cited by examiner

WINDING STRUCTURE OF ROTATING ELECTRIC MACHINE

TECHNICAL FIELD

The present invention relates to a winding structure of a rotating electric machine. In particular, the invention relates to a winding structure of a rotating electric machine having a core body and a winding portion.

BACKGROUND ART

Conventional winding structures of a rotating electric machine are for example disclosed in Japanese Patent Laying-Open Nos. 2000-217290 and 10-313557.

Japanese Patent Laying-Open No. 2000-217290 discloses an electric motor in which windings of each phase are connected in the manner that windings opposite to each other in the radial direction are connected in parallel and a set of thus parallel-connected windings is connected in series with another set of parallel-connected windings.

Japanese Patent Laying-Open No. 10-313557 discloses a rotating electric machine for which the number of turns of windings opposite to each other is adjusted so as to adjust unbalanced magnetic pull.

In some cases, a rotor and a stator of a rotating electric machine are disposed eccentrically with respect to each other, namely respective centers of the rotor and the stator do not coincide. Here, in a winding structure in which series-connected coils are connected in parallel with other series-connected coils, imbalance in electromotive force due to the eccentricity could generate cyclic current in the parallel circuit to accordingly cause increases of vibrations and noise of the rotating electric machine while it is driven.

However, as disclosed in Japanese Patent Laying-Open No. 2000-217290, in the case where parallel circuits are formed for each coil, the larger number of points of connection leads to deterioration in workability and increase in size.

As for the winding structure disclosed in Japanese Patent Laying-Open No. 2000-217290, the adjustment is made in the number of turns, not in the arrangement of windings.

DISCLOSURE OF THE INVENTION

An object of the present invention is to provide a winding structure of a rotating electric machine suppressing generation of cyclic current.

According to the present invention, a winding structure of a rotating electric machine includes a core body having teeth and a winding portion wound around the teeth of the core body. The winding portion has a first coil group and a second coil group. The first coil group and the second coil group are connected in parallel. The first coil group includes a plurality of first coils connected in series. These first coils are wound oppositely in direction by turns in the order in which the first coils are connected in series, and these first coils are arranged in the manner that one coil set and the other coil set of the first coils are spaced apart in the circumferential direction of the core body and are opposite to each other in the radial direction of the core body. The second coil group includes a plurality of second coils connected in series. These second coils are wound oppositely in direction by turns in the order in which the second coils are connected in series, and these second coils are arranged in the manner that one coil set and the other coil set of the second coils are spaced apart in the circumferential direction of the core body and are opposite to each other in the radial direction of the core body.

In the above-described structure, one set of the series-connected coils and the other set of the series-connected coils that are spaced apart from each other in the circumferential direction of the core body are arranged opposite to each other in the radial direction of the core body. Thus, even in the case where the rotor and stator are disposed eccentrically with respect to each other, electromagnetic balance is kept and generation of cyclic current in the parallel circuit is suppressed. Further, since the series-connected coils are wound oppositely in direction by turns in the order in which the coils are connected, the coils can be wound while coil twist is alleviated. Accordingly, the series-connected coils can successively be wound easily.

Preferably, in the winding structure of a rotating electric machine, the first coil group includes a plurality of the first coils adjacent to each other in the circumferential direction of the core body while the first coil group is separated in the circumferential direction of the core body, and the second coil group includes a plurality of the second coils adjacent to each other in the circumferential direction of the core body while the second coil group is separated in the circumferential direction of the core body.

In the winding structure of the distributed-winding type, coils adjacent to each other in the circumferential direction of the core body are wound in respective directions opposite to each other. Thus, even in the case where the first and second coil groups each include a plurality of coils adjacent to each other in the circumferential direction of the core boy, these coils can be wound oppositely in direction by turns in the order in which these coils are connected in series. Accordingly, the series-connected coils can successively be wound easily. Further, by allowing some of the series-connected coils to be arranged adjacently, the wire connecting the coils can be shortened to downsize the rotating electric machine.

Preferably, the winding structure of a rotating electric machine includes the winding portion of a plurality of phases formed with displacement therebetween in the circumferential direction of the core body.

Thus, a winding structure of a rotating electric machine having multiple phases can be provided.

In accordance with the present invention as described above, generation of cyclic current flowing in the parallel circuit of the winding structure of a rotating electric machine can be suppressed.

BEST MODES FOR CARRYING OUT THE INVENTION

Figure 1:
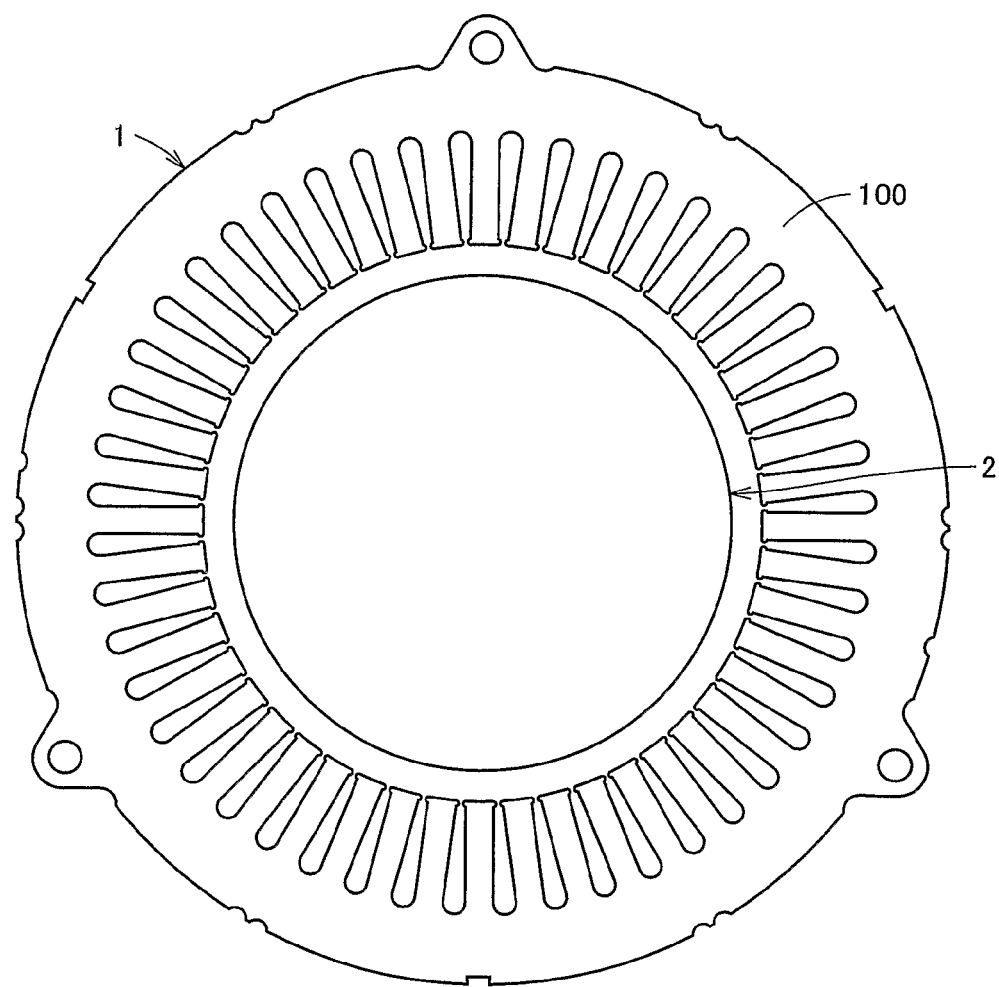
FIG. 1 is an axial cross-sectional view showing a rotating electric machine having a winding structure according to an embodiment of the present invention.

In the following, a description is given of an embodiment of a winding structure of a rotating electric machine according to the present invention. It is noted that like or corresponding components are denoted by like reference characters and a description thereof may not be repeated depending on the case.

FIG. 1 is an axial cross-sectional view showing a rotating electric machine having a winding structure according to an embodiment of the present invention. Referring to FIG. 1, the rotating electric machine includes a stator 1 and a rotor 2. Stator 1 includes a stator core 100 corresponding to "core body" and a stator winding (not shown in FIG. 1) wound around stator core 100.

Figure 2:
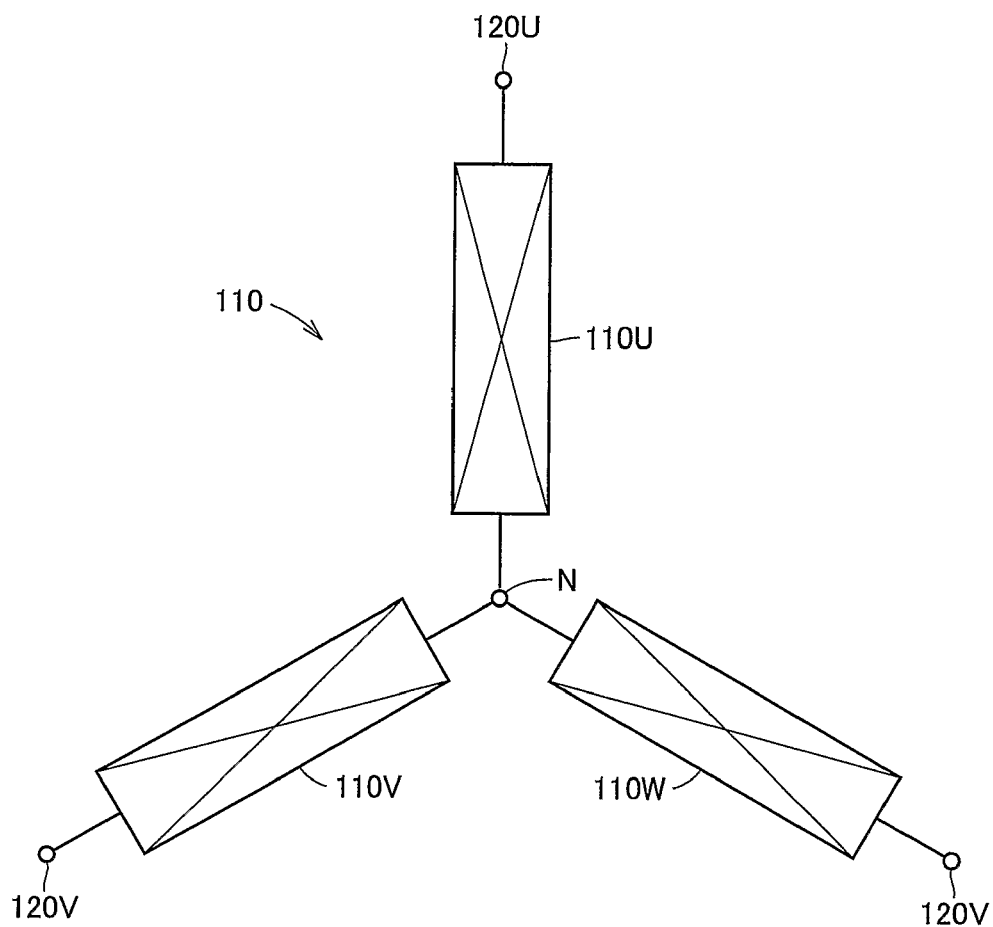
FIG. 2 shows the winding structure according to the embodiment of the present invention.

FIG. 2 shows a stator winding structure of the rotating electric machine shown in FIG. 1. Referring to FIG. 2, a stator winding 110 corresponding to "winding portion" includes a U phase coil 110U, a V phase coil 110V and a W phase coil 110W. Respective one ends of phase coils 110U, 110V and 110W are respectively a U phase terminal 120U, a V phase terminal 120V and a W phase terminal 120W that are connected to respective corresponding phases of a feeding cable that is a three-phase cable. Respective other ends of phase coils 110U, 110V and 110W are connected at a common point, namely a neutral point N.

Figure 3:
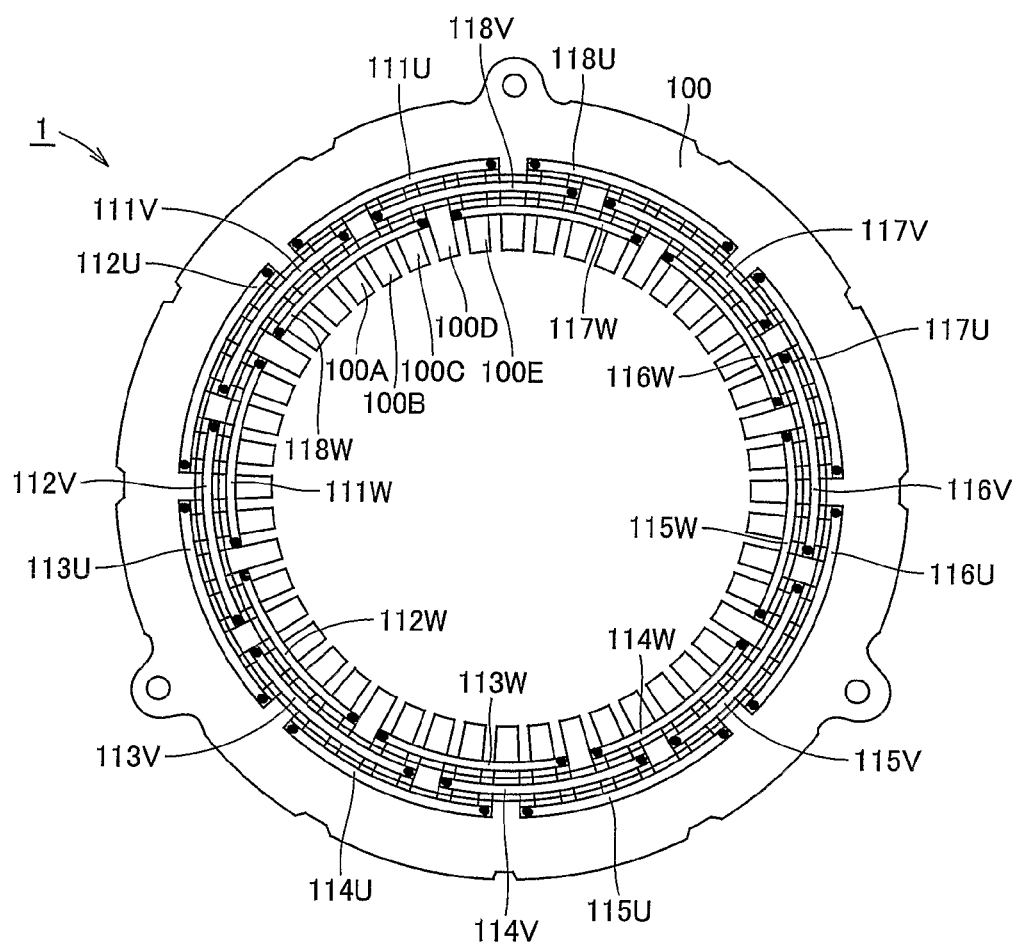
FIG. 3 is a top view showing a stator having the winding structure according to the embodiment of the present invention.

FIG. 3 is a top view showing stator 1 having the winding structure shown FIG. 2.

Referring to FIG. 3, stator core 100 is a hollow cylinder in shape and has 48 teeth (teeth 100A-100E for example) arranged on its inner peripheral surface in the circumferential direction. U phase coil 110U (FIG. 2) is comprised of U phase coils 111U to 118U, V phase coil 110V (FIG. 2) is comprised of V phase coils 111V to 118V and W phase coil 110W (FIG. 2) is comprised of W phase coils 111W to 118W. Phase coils 111U to 118U, 111V to 118V and 111W to 118W are each substantially in the shape of a circular arc. U phase coils 111U to 118U are arranged as radially outermost coils. V phase coils 111V to 118V are arranged on the inside of U phase coils 111U to 118U and at a certain distance in the circumferential direction with respect to U phase coils 111U to 118U. W phase coils 111W to 118W are arranged on the inside of V phase coils 111V to 118V and at a certain distance in the circumferential direction with respect to V phase coils 111V to 118V.

Each of phase coils 111U to 118U, 111V to 118V and 111W to 118W is wound around a plurality of corresponding teeth. For example, U phase coil 111U is formed by being wound a predetermined number of times around corresponding teeth 100A to 100E.

Other coils 112U to 118U, 111V to 118V and 111W to 118W are each also wound around corresponding teeth and thus formed similarly to U phase coil 111U.

Each phase coil is wound in the direction opposite to the direction in which an adjacent coil of the same phase is wound. For example, U phase coil 111U is wound in the direction opposite to the direction in which U phase coil 118U is wound, and U phase coil 112U is wound in the direction opposite to the direction in which U phase coil 111U is wound, namely in the same direction as the direction in which U phase coil 118U is wound. Here, it is supposed that the direction in which U phase coil 111U is wound is "first direction" and the direction in which U phase coil 112U is wound is "second direction." Then, U phase coils 111U, 113U, 115U, 117U are wound in the "first direction," and U phase coils 112U, 114U, 116U, 118U are wound in the "second direction."

Figure 4:
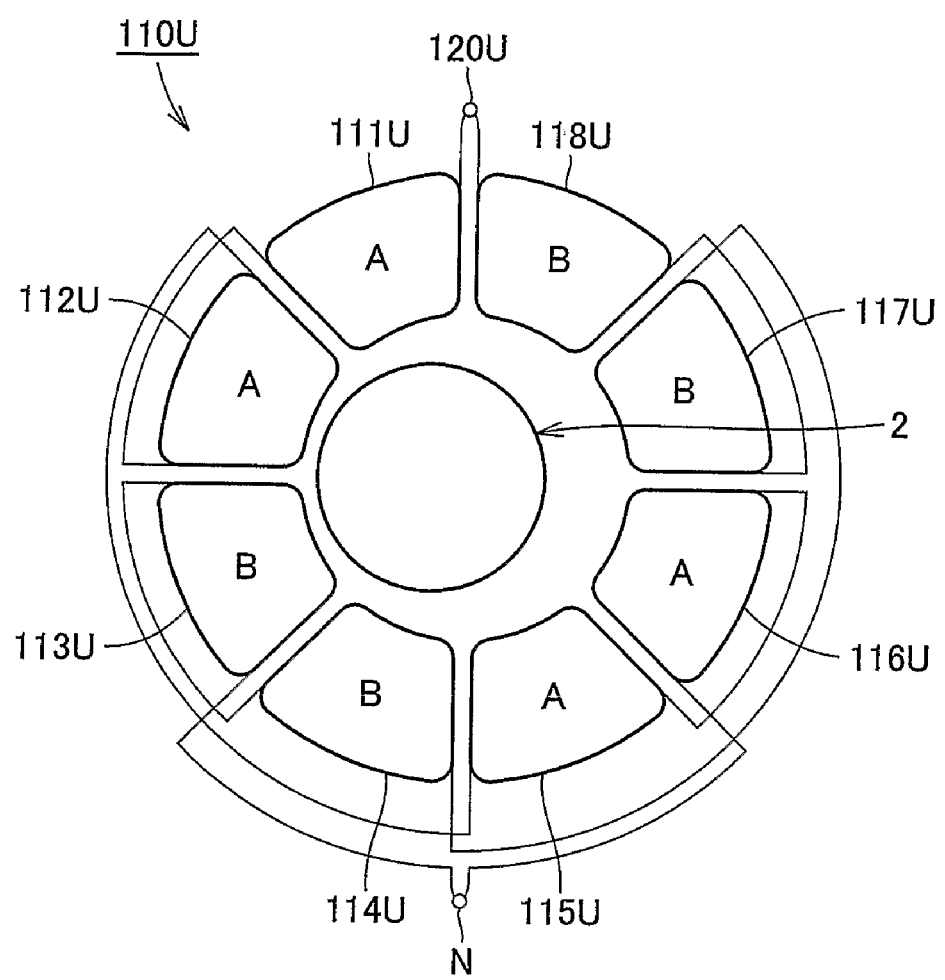
FIG. 4 schematically shows details of a winding structure according to the embodiment of the present invention.
Figure 5:
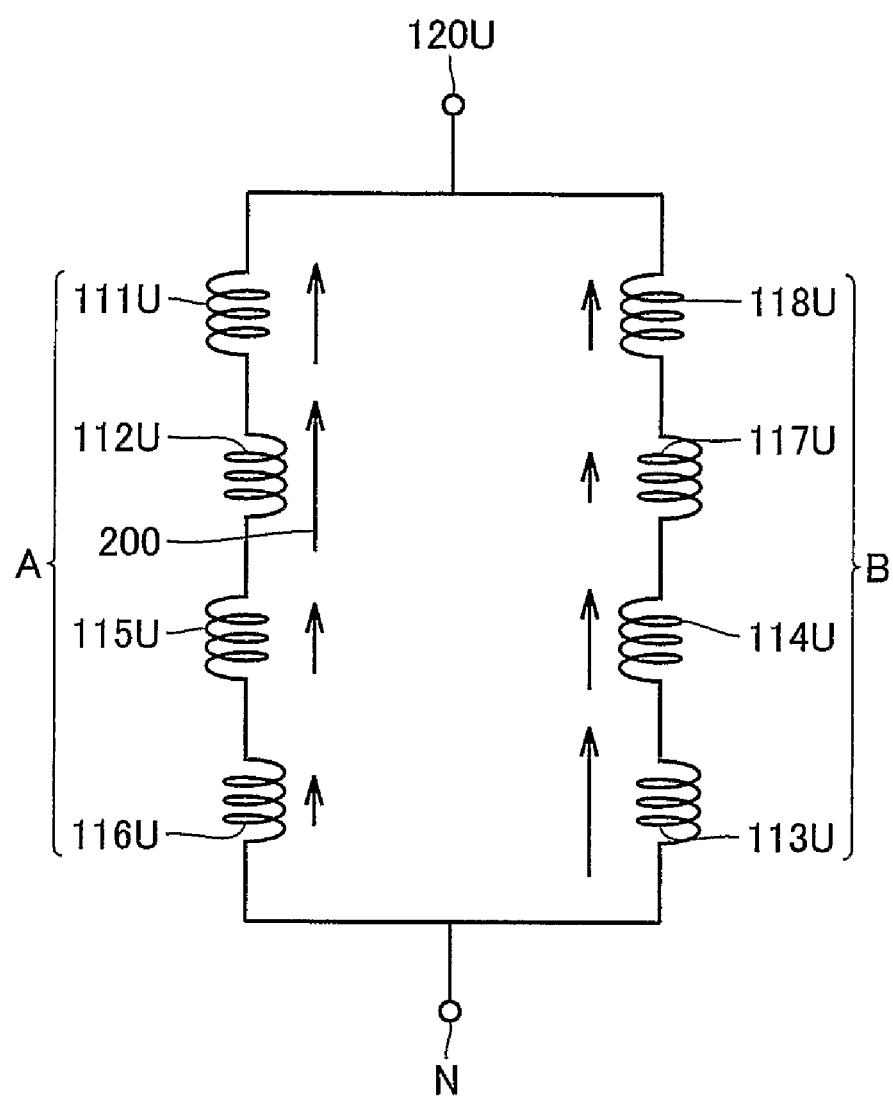
FIG. 5 is an equivalent circuit diagram showing the winding structure in FIG. 4.

FIG. 4 schematically shows a winding structure including U phase coils 111U to 118U. FIG. 5 is an equivalent circuit diagram showing the winding structure in FIG. 4. Referring to FIGS. 4 and 5, "first coil group (series coil A)" is comprised of a plurality of "first coils" that are U phase coils 111U, 112U, 115U, 116U connected in series and having one end indicated as a U phase terminal 120U and the other end indicated as a neutral point N. "Second coil group (series coil B)" is comprised of a plurality of "second coils" that are U phase coils 113U, 114U, 117U, 118U connected in series and having one end indicated as U phase terminal 120U and the other end indicated as neutral point N. More specifically, in the winding structure of the present embodiment, a group of a plurality of series-connected U phase coils 111U, 112U, 115U, 116U (series coil A) and a group of a plurality of series-connected U phase coils 113U, 114U, 117U, 118U (series coil B) are connected in parallel.

As shown in FIG. 4, U phase coils 111U, 112U, 115U, 116U belonging to "series coil A" are arranged in the manner that one set of coils and the other set of coils of these U phase coils are spaced apart from each other in the circumferential direction of stator core 100 while opposite to each other in the radial direction of stator core 100. More specifically, one set of U phase coils 111U, 112U and the other set of U phase coils 115U, 116U are formed to be apart from each other by 180° in the circumferential direction of stator core 100.

U phase coils 113U, 114U, 117U, 118U belonging to "series coil B" are arranged in the manner that one set of coils and the other set of coils of these U phase coils are spaced apart from each other in the circumferential direction of stator core 100 while opposite to each other in the radial direction of stator core 100. More specifically, one set of U phase coils 113U, 114U and the other set of U phase coils 117U, 118U are formed to be apart from each other by 180° in the circumferential direction of stator core 100.

Figure 6:
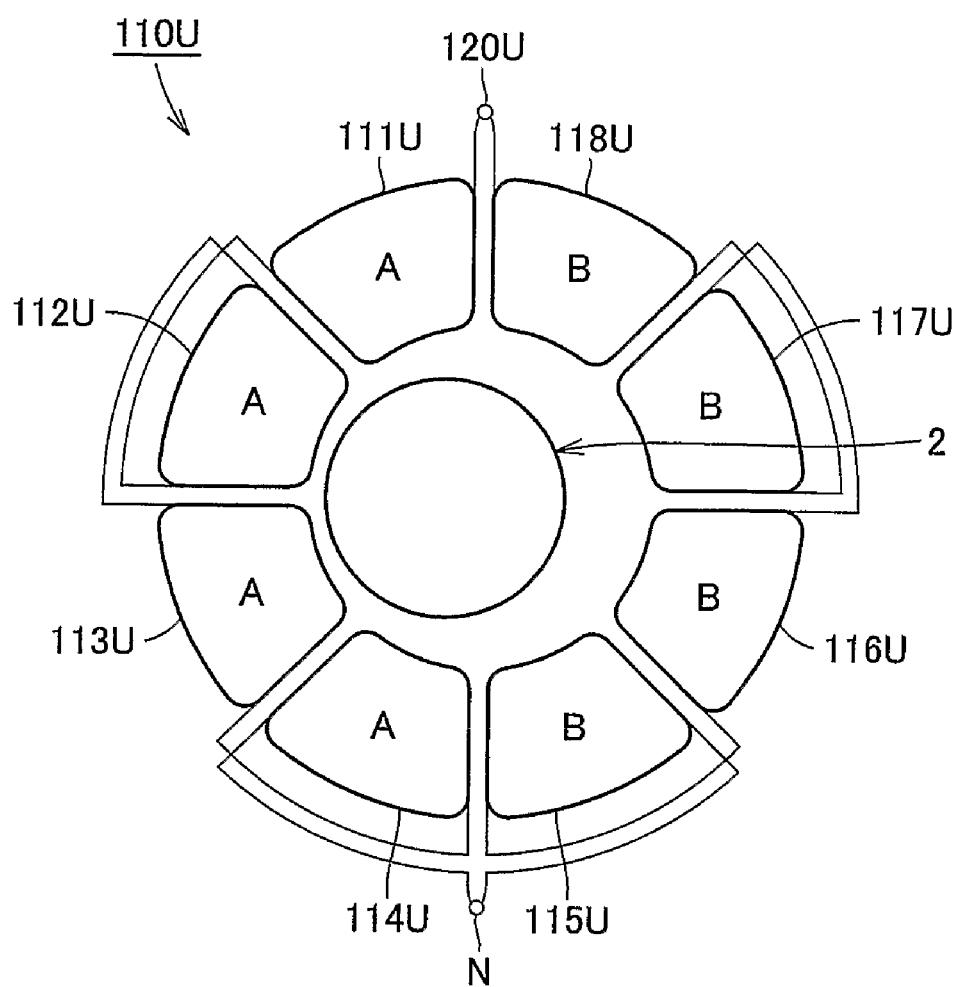
FIG. 6 schematically shows details of a winding structure to be compared with the winding structure shown in FIG. 4.
Figure 7:
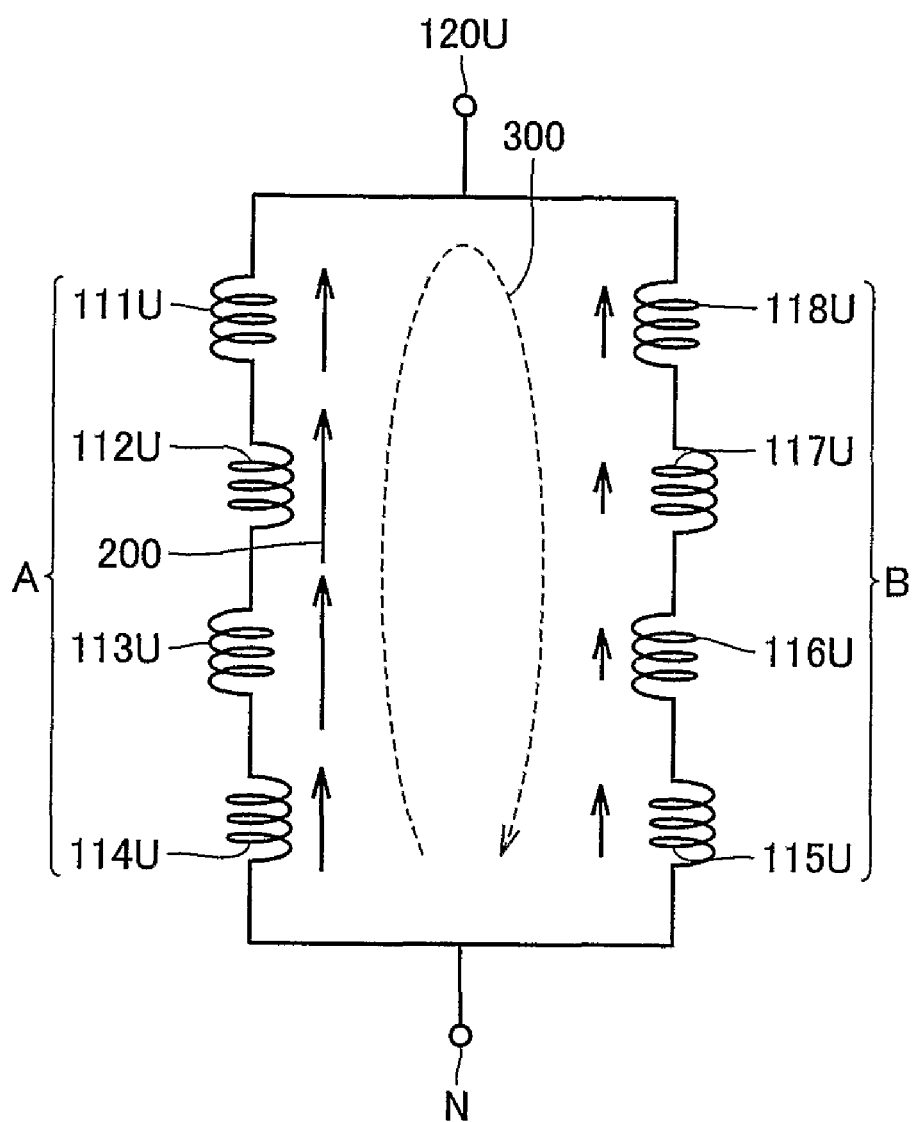
FIG. 7 is an equivalent circuit diagram showing the winding structure in FIG. 6.

FIG. 6 schematically shows a winding structure to be compared with the winding structure shown in FIG. 4. FIG. 7 is an equivalent circuit diagram showing the winding structure in FIG. 6. Referring to FIGS. 6 and 7, the winding structure in the present comparative example is basically similar to the winding structure shown in FIGS. 4 and 5 while different in the state of connection of U phase coils 111U to 118U. Specifically, in the present comparative example, a group of a plurality of series-connected U phase coils 111U to 114U (series coil A) and a group of a plurality of series-connected U phase coils 115U to 118U (series coil B) are connected in parallel.

Regarding the winding structure of the present comparative example, in the case as shown in FIG. 6 where rotor 2 is provided eccentrically with respect to stator 1, there arises a state in which the sum of electromotive forces 200 of U phase coils 111U to 114U (series coil A) does not balance with the sum of electromotive forces 200 of U phase coils 115U to 118U (series coil B) as shown in FIG. 7. As a result, cyclic current 300 is generated that flows in the parallel circuit comprised of the two sets of series coils. Accordingly, there arises a difference in electric current between circuits of three phases and a harmonic component of 2f (f: electrical frequency) is generated in magnetomotive force. Consequently, the force exerted on stator 1 could vary to cause vibrations and noise to increase while the rotating electric machine is driven.

For example, a hybrid vehicle with a rotating electric machine mounted thereon has a mode of stopping the engine while the vehicle is running (for example, EV drive mode in which the vehicle running at low speed is driven by the rotating electric machine to which electric power is supplied from a storage mechanism, regenerative mode in which kinetic energy of the vehicle is converted into electrical energy to be accumulated in the storage mechanism while the vehicle is decelerated). In such a mode, background noise is low and thus such noises as gear noise and motor noise are relatively easy to be heard. Therefore, it is important to suppress noise that could be generated while the rotating electric machine is driven. Further, in some cases, when the rotating electric machine is to be mounted on the vehicle, any restrictions on space and weight impose restrictions on the employment of measures for addressing noise of transmission and resonance systems. For this reason as well, it is important to suppress noise while the rotating electric machine is driven, and simultaneously meet such restricting conditions.

In terms of efficient achievement of high output and high torque, it is preferable that the gap between stator 1 and rotor 2 is set to be as small as possible. However, in the case where the gap is set to be small, even small eccentricity could have a great influence on the gap between the stator and rotor, which is likely to result in large vibratory force. Further, in terms of convenience of manufacture, it is difficult to set the degree of eccentricity between stator 1 and rotor 2 to the degree that generates no cyclic current 300 in the winding structure shown in FIGS. 6 and 7. In the case where a control system is used to try to suppress the imbalance in electric current due to the eccentricity, such a system would be a complicated one.

In contrast, in the present embodiment, the first coil group and the second coil group each have one coil set and the other coil set spaced apart in the circumferential direction of stator core 100 while opposite to each other in the radial direction of stator core 100, as described above. Thus, even if stator 1 and rotor 2 are arranged eccentrically with respect to each other, the electromagnetic balance is kept (FIG. 5) and generation of cyclic current in the parallel circuit is suppressed. In this way, vibrations and noise that could occur while the rotating electric machine is driven are suppressed. Moreover, any loss that could be generated while the rotating electric machine is driven is reduced and thus the operation efficiency is improved.

Figure 8:
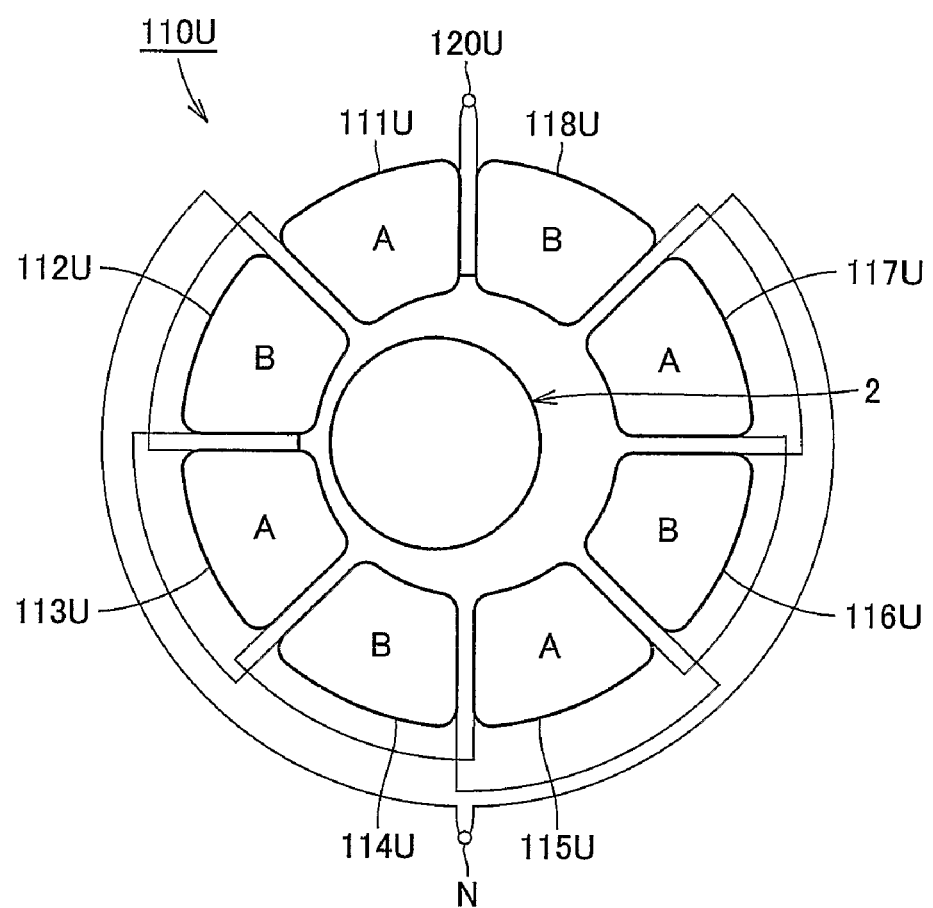
FIG. 8 schematically shows details of another winding structure to be compared with the winding structure shown in FIG. 4.
Figure 9:
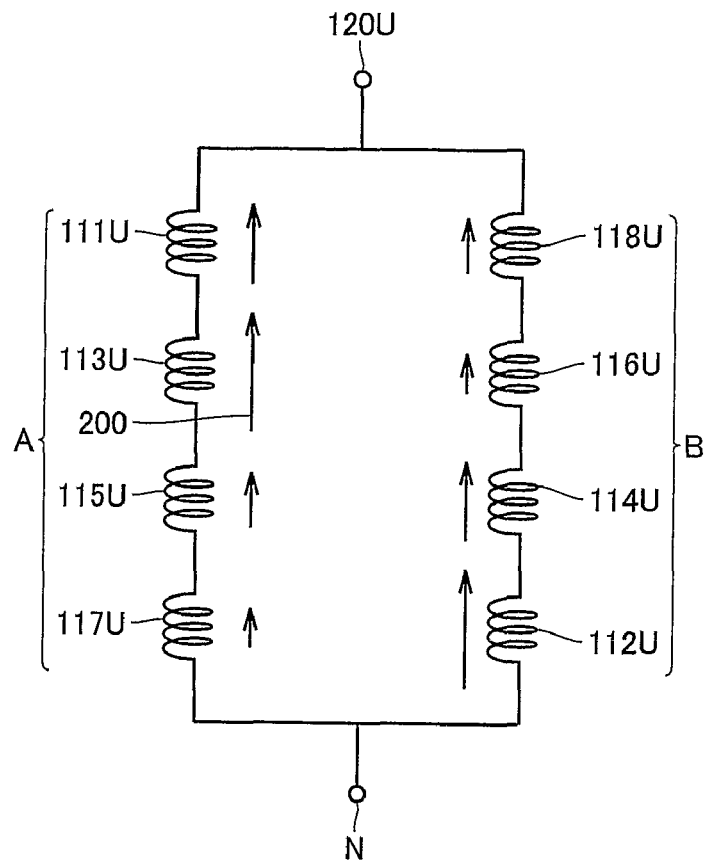
FIG. 9 is an equivalent circuit diagram showing the winding structure in FIG. 8.

FIG. 8 schematically shows another winding structure to be compared with the winding structure shown in FIG. 4. FIG. 9 is an equivalent circuit diagram of the winding structure shown in FIG. 8. Referring to FIGS. 8 and 9, the winding structure in the present comparative example is basically similar to the winding structure shown in FIGS. 4 and 5 while different from the winding structure shown in FIGS. 4 and 5 in the state of connection of U phase coils 111U to 118U. Specifically, a group of a plurality of series-connected U phase coils 111U, 113U, 115U, 117U (series coil A) and another group of a plurality of series-connected U phase coils 112U, 114U, 116U, 118U (series coil B) are connected in parallel.

In the winding structure of the present comparative example, the direction in which U phase coils 111U, 113U, 115U, 117U belonging to series coil A are wound is opposite to the direction in which U phase coils 112U, 114U, 116U, 118U belonging to series coil B are wound. U phase coils 111U, 113U, 115U, 117U belonging to series coil A are wound in the same direction, while U phase coils 112U, 114U, 116U, 118U belonging to series coil B are wound in the same direction.

Figure 10:
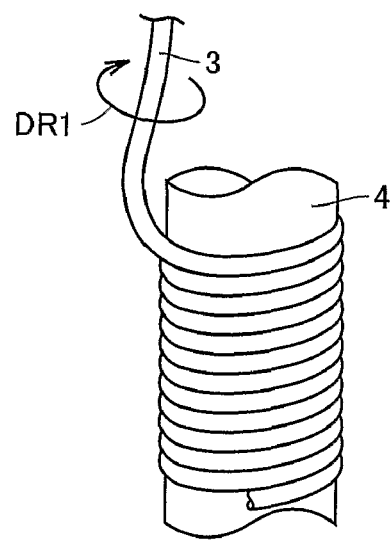
FIG. 10 shows a winding machine for forming a winding.

FIG. 10 is a schematic diagram showing a winding machine for forming a winding (flier winding machine for example). The stator coil is formed by the winding machine and thereafter mounted on the stator core by means of an inserter. Referring to FIG. 10, a winding 3 is wound around a winding frame 4 to form a coil. At this time, winding 3 tends to twist in the direction indicated by an arrow DR1 (the twist may also be referred to as "coil twist" herein). As the winding structure shown in FIGS. 8 and 9, if the series-connected coils are all wound in the same direction, the degree of coil twist gradually increases, which could make it difficult to successively wind series-connected coils. In order to form coils without the coil twist, special facilities are necessary, which could result in complicated process steps and increased cost.

In contrast, in the present embodiment, as shown in FIG. 5, U phase coils 111U, 112U, 115U, 116U belonging to series coil A are wound in the opposite directions alternately in the order in which these coils are connected. Similarly, U phase coils 113U, 114U, 117U, 118U belonging to series coil B are wound in the opposite directions alternately in the order in which the coils are connected. In this way, the coils can be wound while the coil twist is alleviated. Specifically, the coil twist generated while U phase coil 111U is wound for example can be alleviated while U phase coil 112U is wound. Accordingly, series coils A and B can successively and easily be wound.

Further, regarding the winding structure shown in FIGS. 8 and 9, an input line connected to U phase terminal 120U and a GND line connected to neutral point N are relatively close to each other in the circumferential direction, which results in deterioration in electrical insulation performance of the winding structure. In contrast, regarding the winding structure of the present embodiment, the input line and the GND line are circumferentially spaced apart to the degree that ensures electrical insulation.

It is noted that, in the winding structure of the present embodiment, U phase coils 111U, 112U, 115U, 116U and U phase coils 113U, 114U, 117U, 118U include a plurality of coils adjacent to each other in the circumferential direction of stator core 100 while separated in the circumferential direction of stator core 100. Specifically, for example, U phase coils 111U, 112U, 115U, 116U belonging to "first coil group" includes U phase coils 111U and 112U adjacent to each other in the circumferential direction of stator core 100 and includes U phase coils 115U, 116U circumferentially adjacent to each other, while separated in the circumferential direction of stator core 100.

Generally in a winding structure of the distributed winding type like the one in the present embodiment, coils adjacent to each other in the circumferential direction of stator core 100 are wound in respective directions opposite to each other. As described above, some coils included in "series coil" are arranged adjacent to each other and thus the coil-to-coil wire that connects a plurality of coils can be shortened to downsize the coil end.

The above-described details are summarized as follows. The winding structure in the present embodiment includes stator core 100 having teeth (100A-100E for example) and stator winding 110 wound around the teeth of stator core 100. Stator winding 110 has series coils A, B. Series coils A, B are connected in parallel. Series coil A includes U phase coils 111U, 112U, 115U, 116U connected in series. U phase coils 111U, 112U, 115U, 116U are wound oppositely in direction by turns in the order in which the coils are connected in series. U phase coils 111U, 112U, 115U, 116U are arranged in the manner that one set of coils (U phase coils 111U, 112U) and the other set of coils (U phase coils 115U, 116U) are spaced apart in the circumferential direction of stator core 100 and are opposite to each other in the radial direction of stator core 100. Series coil B includes U phase coils 113U, 114U, 117U, 118U connected in series. U phase coils 113U, 114U, 117U, 118U are wound oppositely in direction by turns in the order in which the coils are connected in series. U phase coils 113U, 114U, 117U, 118U are arranged in the manner that one set of coils (U phase coils 113U, 114U) and the other set of coils (U phase coils 117U, 118U) are spaced apart in the circumferential direction of stator core 100 and are opposite to each other in the radial direction of stator core 100.

While the present embodiment has been described in connection with the U phase coils, it would clearly be seen that the same idea and concept are applicable to V and W phase coils.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

As seen from the description above, the present invention is applied to a winding structure of a rotating electric machine.

The invention claimed is:

1. A winding structure of a rotating electric machine, comprising:
a core body having teeth; and
a winding portion wound around the teeth of said core body, wherein
said winding portion has a first coil group and a second coil group,
said first coil group and said second coil group are connected in parallel,
said first coil group includes a plurality of first coils connected in series,
said plurality of first coils are wound oppositely in direction by turns in the order in which said first coils are connected in series,
said plurality of first coils are grouped into at least a first coil set and a second coil set and spaced apart in the circumferential direction of said core body such that the first coil set and the second coil set are positioned opposite to each other in the radial direction of said core body in order to suppress the generation acyclic current in said first coil group and second coil group connected in parallel,
said first coil set and said second coil set each include at least two adjacent first coils from the plurality of first coils,
said second coil group includes a plurality of second coils connected in series,
said plurality of second coils are wound oppositely in direction by turns in the order in which said second coils are connected in series,
said plurality of second coils are grouped into at least a third coil set and a fourth coil set and spaced apart in the circumferential direction of said core body such that the third coil set and the fourth coil set are positioned opposite to each other in the radial direction of said core body in order to suppress the generation of cyclic current in said first coil group and second coil group connected in parallel, and
said third coil set and said fourth coil set each include at least two adjacent second coils from the plurality of second coils.

2. The winding structure of a rotating electric machine according to claim 1, wherein one coil set and the other coil set of said first coils are spaced apart from each other in the circumferential direction of said core body and are both adjacent to one coil set and the other coil set of said second coils spaced apart from each other in the circumferential direction of said core body.

3. The winding structure of a rotating electric machine according to claim 1, including said winding portion of a plurality of phases formed with displacement therebetween in the circumferential direction of said core body.

4. The winding structure of a rotating electric machine according to claim 1, wherein
said core body is a hollow cylinder in shape and has a plurality of said teeth arranged on inner peripheral surface of said core body in a circumferential direction of said core body,
said winding portion includes U phase coils, V phase coils and W phase coils,
said U phase coils are arranged as radially outermost coils,
said V phase coils are arranged on the inside of U phase coils and at a certain distance in said circumferential direction with respect to U phase coils, and
said W phase coils are arranged on the inside of V phase coils and at said certain distance in said circumferential direction with respect to V phase coils.

5. The winding structure of a rotating electric machine according to claim 1, wherein
each of said plurality of first coils and said plurality of second coils is wound around a plurality of corresponding said teeth.

6. The winding structure of a rotating electric machine according to claim 1, wherein
said core body is a hollow cylinder in shape and has a plurality of said teeth arranged on inner peripheral surface of said core body in a circumferential direction of said core body,
said winding portion includes U phase coils, V phase coils and W phase coils,
said U phase coils, said V phase coils and said W phase coils are each substantially in the shape of a circular arc,
said U phase coils are arranged as radially outermost coils,
said V phase coils are arranged on the inside of U phase coils and at a certain distance in said circumferential direction with respect to U phase coils,
said W phase coils are arranged on the inside of V phase coils and at said certain distance in said circumferential direction with respect to V phase coils,
each of said U phase coils, said V phase coils and said W phase coils is wound a predetermined number of times around a plurality of said teeth, and
each of said U phase coils, said V phase coils and said W phase coils is wound in the direction opposite to the direction in which an adjacent coil of the same phase is wound.

7. The winding structure of a rotating electric machine according to claim 1, further comprising a rotor, wherein said rotor is disposed eccentrically with respect to said core body.

8. The winding structure of a rotating electric machine according to claim 1, wherein any two adjacent coils of said plurality of first coils and said plurality of second coils are wound oppositely in direction by turns.

9. The winding structure of a rotating electric machine according to claim 1, wherein any two coils of said plurality of first coils and said plurality of second coils positioned opposite to each other in the radial direction of said core body are wound in the same direction by turns.

* * * * *